(12) United States Patent
Murata

(10) Patent No.: US 10,820,152 B2
(45) Date of Patent: Oct. 27, 2020

(54) DEVICE DIVERSITY CORRECTION METHOD FOR RSS-BASED PRECISE LOCATION TRACKING

(71) Applicant: INTERNATIONAL BUSINESS MACHINES CORPORATION, Armonk, NY (US)

(72) Inventor: Masayuki Murata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/669,530

(22) Filed: Aug. 4, 2017

(65) Prior Publication Data
US 2019/0045327 A1    Feb. 7, 2019

(51) Int. Cl.
*H04W 24/00* (2009.01)
*H04W 4/02* (2018.01)
*G01S 5/02* (2010.01)

(52) U.S. Cl.
CPC ............. *H04W 4/027* (2013.01); *G01S 5/021* (2013.01); *G01S 5/0252* (2013.01); *G01S 5/0278* (2013.01)

(58) Field of Classification Search
CPC ...... H04W 4/027; G01S 5/0252; G01S 5/021; G01S 5/0278
USPC ....................................................... 455/456.1
See application file for complete search history.

(56) References Cited

U.S. PATENT DOCUMENTS

| | | | | |
|---|---|---|---|---|
| 2013/0289916 | A1* | 10/2013 | Meyer | G01S 5/021 702/94 |
| 2015/0181387 | A1* | 6/2015 | Shaw | H04W 24/00 455/456.1 |
| 2015/0223027 | A1* | 8/2015 | Ahn | G01S 5/0236 455/456.1 |
| 2017/0336494 | A1* | 11/2017 | Han | G01S 11/06 |

FOREIGN PATENT DOCUMENTS

| | | |
|---|---|---|
| EP | 3096155 A1 | 11/2016 |
| WO | 2016093860 A1 | 6/2016 |

OTHER PUBLICATIONS

Xu et al, "Enhancing WiFi-based Localization with Visual Clues", CSE Dept, UBICOMP, Sep. 2015, pp. 963-974.

Tsui et al, "Unsupervised Learning for Solving RSS Hardware Variance Problem in WiFi Localization", Mobile Networks and Applications (MONET), vol. 14, No. 5, Oct. 2009, pp. 1-15.

* cited by examiner

*Primary Examiner* — Huy C Ho
(74) *Attorney, Agent, or Firm* — Tutunjian & Bitetto, P.C.; Vazken Alexanian

(57) ABSTRACT

A computer-implemented method includes acquiring a plurality of received signal strength indicators obtained by a target wireless terminal which observes a plurality of wireless signals transmitted from a plurality of transmitters, selecting a set of received signal strength indicators which is a portion of the plurality of received signal strength indicators, acquiring a set of reference received signal strength indicators corresponding to the set of received signal strength indicators, from a database of a plurality of reference received signal strength indicators that serve as a reference for the plurality of received signal strength indicators, and estimating a received signal strength indicator offset of the target wireless terminal, based on the set of (Continued)

received signal strength indicators and the set of reference received signal strength indicators.

20 Claims, 5 Drawing Sheets

Observation vector: $\vec{r}_t^{B(1:L)} = \left(r_t^{B(1)}, \ldots, r_t^{B(L)}\right)^T$ (1)

Observation model $$p\left(\vec{r}_t^{B(1:L)} \middle| \vec{r}^{A(1:L)}(x_t), \delta_t\right) = \prod_{i=1}^{L} p\left(r_t^{B(i)} \middle| r^{A(i)}(x_t), \delta_t\right)$$ (2)

- $\delta_{t/s}$ : the estimated value of RSSI offset at time $t$ given observations until time $s$.
- $\sigma_{t/s}^{\delta 2}$ : the estimated variance of RSSI at time $t$ given observations until time $s$.
- $\sigma_t^{b2}$ : the noise variance to incorporate uncertainty into $\sigma_{t:t-1}^{\delta 2}$ $\delta_{t:t-1} = \delta_{t-1:t-1}, \sigma_{t:t-1}^{\delta 2} = \sigma_{t-1:t-1}^{\delta 2} + \sigma_t^{b2}$ (4)

$\dfrac{1}{\sigma_t^{r2}} = \sum_{i=1}^{L} \dfrac{1}{\left(\sigma^{A(i)}(x_t)\right)^2}$ (5)

$\delta_t^o = \sigma_t^{r2} \sum_{i=1}^{L} \dfrac{\left(r_t^{B(i)} - \mu^{A(i)}(x_t)\right)}{\left(\sigma^{A(i)}(x_t)\right)^2}$ (6)

$K_t = \sigma_{t:t-1}^{\delta 2}\left[\sigma_{t:t-1}^{\delta 2} + \sigma_t^{r2}\right]^{-1}$ (7)

$\delta_{t:t} = \delta_{t:t-1} + K_t(\delta_t^o - \delta_{t:t-1})$ (8)

$\sigma_{t:t}^{\delta 2} = (1 - K_t)\sigma_{t:t-1}^{\delta 2}$ (9)

*FIG. 3*

Observation vector: $\vec{r}_t^{B(1:L)} = \left(r_t^{B(1)}, \ldots, r_t^{B(L)}\right)^T$, Lower limit: $r_t^{B(L+1)}$ (1')

Observation model transformed to a truncated probability distribution $$q\left(\vec{r}_t^{B(1:L)} \middle| \vec{r}^{A(1:L)}(x_t), \delta_t, r_t^{B(L+1)}\right) = \prod_{i=1}^{L} \frac{p\left(r_t^{B(i)}(x) \middle| r^{A(i)}(x_t), \delta_t\right)}{1 - P\left(r_t^{B(L+1)} \middle| r^{A(i)}(x_t), \delta_t\right)}$$ (2')

$\delta_{t:t-1} = \delta_{t-1:t-1}, \sigma_{t:t-1}^{\delta 2} = \sigma_{t-1:t-1}^{\delta 2} + \sigma_t^{b2}$ (4)

$\alpha = \dfrac{r_t^{B(L+1)} - \mu^{A(i)}(x_t) + \delta_{t:t-1}}{\sigma^{A(i)}(x_t)}$ (11)

$\mu^{A(i)'}(x_t) = \mu^{A(i)}(x_t) + \sigma^{A(i)}(x_t)\dfrac{\phi(\alpha)}{1-\Phi(\alpha)}$ (12)

$\left(\sigma^{A(i)'}(x_t)\right)^2 = \left(\sigma^{A(i)}(x_t)\right)^2 \left[1 + \dfrac{\alpha\phi(\alpha)}{1-\Phi(\alpha)} - \left(\dfrac{\phi(\alpha)}{1-\Phi(\alpha)}\right)^2\right]$ (13)

$\dfrac{1}{(\sigma_t^{r'})^2} = \sum_{i=1}^{L} \dfrac{1}{(\sigma^{A(i)'}(x_t))^2}$ (5')

$\delta_t^{a'} = (\sigma_t^{r'})^2 \sum_{i=1}^{L} \dfrac{\left(r_t^{B(i)} - \mu^{A(i)'}(x_t)\right)}{(\sigma^{A(i)'}(x_t))^2}$ (6')

$K_t' = \sigma_{t:t-1}^{\delta 2} \left[\sigma_{t:t-1}^{\delta 2} + (\sigma_t^{r'})^2\right]^{-1}$ (7')

$\delta_{t:t} = \delta_{t:t-1} + K_t'(\delta_t^{a'} - \delta_{t:t-1})$ (8')

$\sigma_{t:t}^{\delta 2} = (1 - K_t')\sigma_{t:t-1}^{\delta 2}$ (9')

FIG. 4

DEVICE DIVERSITY CORRECTION METHOD FOR RSS-BASED PRECISE LOCATION TRACKING

BACKGROUND

Technical Field

The present invention relates to estimation of received signal strength indicator offset.

Description of the Related Art

Conventional technology has been proposed for performing localization using Received Signal Strength Indicators (RSSIs) of radio waves, such as Wi-Fi, in an indoor environment where Global Positioning Systems (GPSs) cannot be used.

SUMMARY

According to an embodiment of the present invention, a computer-implemented method includes acquiring a plurality of received signal strength indicators obtained by a target wireless terminal observing a plurality of wireless signals transmitted from a plurality of transmitters, selecting a set of received signal strength indicators which is a portion of the plurality of received signal strength indicators, acquiring a set of reference received signal strength indicators corresponding to the set of received signal strength indicators, from a database of a plurality of reference received signal strength indicators that serve as a reference for the plurality of received signal strength indicators, and estimating a received signal strength indicator offset of the target wireless terminal, based on the set of received signal strength indicators and the set of reference received signal strength indicators.

According to another embodiment of the present invention, a computer program product is provided for estimating a received signal strength indicator offset, the computer program product comprising a non-transitory computer readable storage medium having program instructions embodied therewith, the program instructions executable by a device to cause the device to perform operations including acquiring a plurality of received signal strength indicators obtained by a target wireless terminal observing a plurality of wireless signals transmitted from a plurality of transmitters, selecting a set of received signal strength indicators which is a portion of the plurality of received signal strength indicators acquiring a set of reference received signal strength indicators corresponding to the set of received signal strength indicators, from a database of a plurality of reference received signal strength indicators that serve as a reference for the plurality of received signal strength indicators, and estimating a received signal strength indicator offset of the target wireless terminal, based on the set of received signal strength indicators and the set of reference received signal strength indicators.

According to another embodiment of the present invention, an estimation apparatus includes a processor, and a memory coupled to the processor, wherein the memory includes program instructions executable by the processor to cause the processor to perform a method includes acquiring a plurality of received signal strength indicators obtained by a target wireless terminal observing a plurality of wireless signals transmitted from a plurality of transmitters, selecting a set of received signal strength indicators which is a portion of the plurality of received signal strength indicators, acquiring a set of reference received signal strength indicators corresponding to the set of received signal strength indicators, from a database of a plurality of reference received signal strength indicators that serve as a reference for the plurality of received signal strength indicators, and estimating a received signal strength indicator offset of the target wireless terminal, based on the set of received signal strength indicators and the set of reference received signal strength indicators.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

The following description will provide details of preferred embodiments with reference to the following figures wherein:

FIG. 3 shows exemplary expressions used in the process of computing log-likelihood, in accordance with an embodiment of the present invention;

FIG. 4 shows other exemplary expressions used in the process of computing log-likelihood, in accordance with an embodiment of the present invention.

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
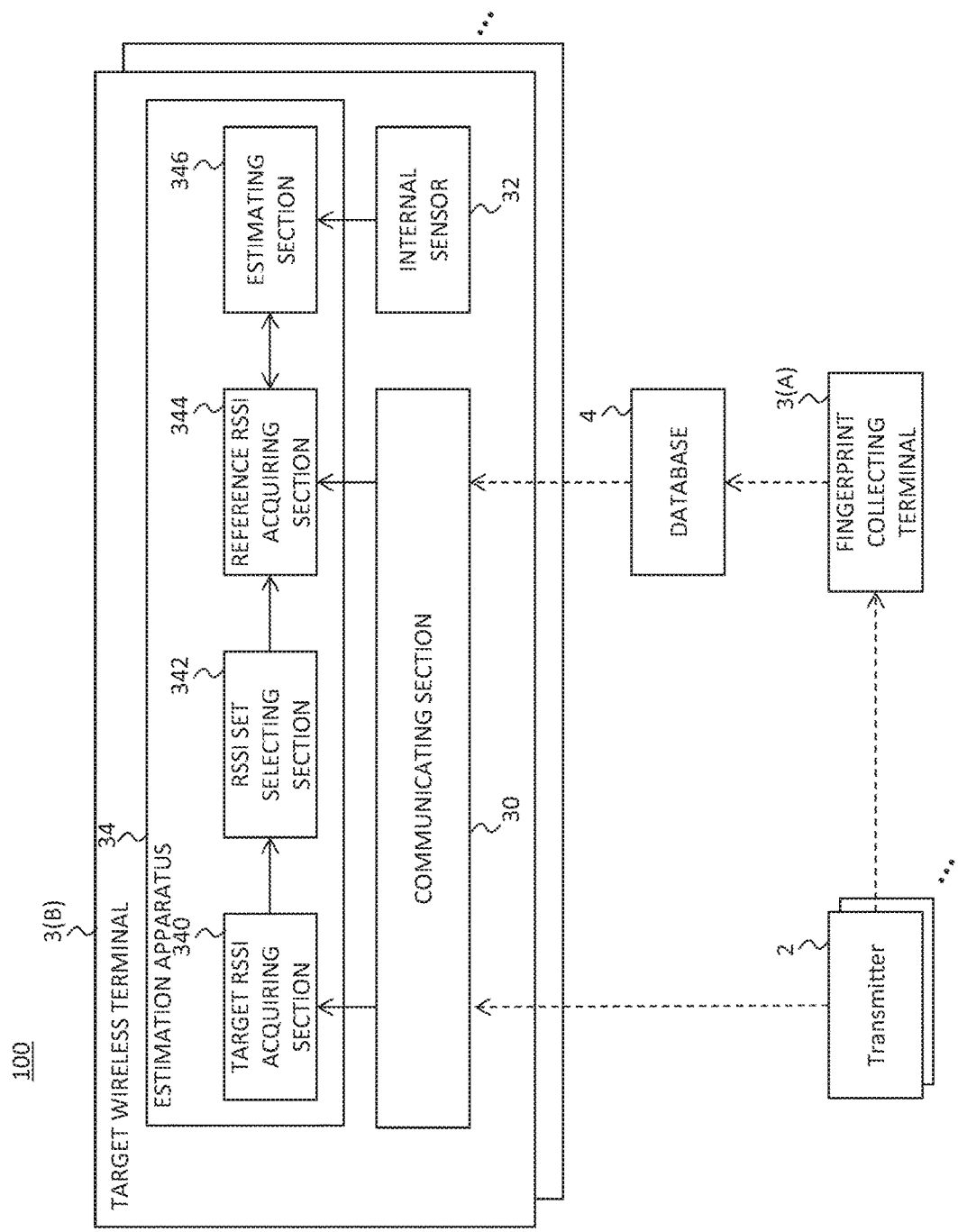
FIG. 1 shows an estimation apparatus according to an embodiment of the present invention.

FIG. 1 shows a localization system 100 according to an embodiment of the present invention. The localization system 100 is a system that is capable of performing localization in environments where GPS cannot be used (e.g., indoors in the present embodiment). As one example in the present embodiment, the localization system 100 performs localization using a fingerprint method, but may use other methods instead. The localization system 100 includes a plurality of transmitters 2, a plurality of terminals 3 (as one example in the present embodiment, one or more fingerprint collecting terminals 3(A) and one or more target wireless terminals 3(B)), and a database 4.

The plurality of transmitters 2 emit wireless signals. Each transmitter 2 may emit a wireless signal with a strength enabling the signal to reach at least a partial region of an indoor environment. The arrival areas of the wireless signals from the transmitters 2 may overlap with each other, and may realize overall coverage of the entire indoor area. The wireless signals may be beacons for establishing wireless communication between each of the one or more terminals 3 existing in the indoor environment and a wireless LAN (e.g., Wi-Fi) and/or BLE (Bluetooth® Low Energy). As an example, the wireless signals may be emitted at intervals of 100 ms. The transmitters 2 may be secured in the indoor environment, and may be housed in a wireless LAN access point, for example.

The fingerprint collecting terminals 3(A) receive the wireless signals from the one or more transmitters 2 at respective positions in the indoor environment, and supply the database 4 with position information at this time and the RSSIs of the one or more wireless signals in association with each other. The fingerprint collecting terminals 3(A) may be the same type of apparatuses as the target wireless terminals 3(B), or may be a different type. If the fingerprint collecting terminals 3(A) are the same type of apparatuses as the target wireless terminals 3(B), the position information at the time when the wireless signals are received may be acquired in the same manner as by the target wireless terminals 3(B). If the fingerprint collecting terminals 3(A) are a type of apparatus different from the target wireless terminals 3(B), the position information at the time when the wireless signals are received may be acquired through input from an operator.

The database 4 stores the RSSIs of the one or more wireless signals received by the fingerprint collecting terminals 3(A) as reference RSSIs, in association with each position where the RSSIs are observed, among a plurality of positions in the indoor environment. The one or more reference RSSIs associated with each position may be probability distributions. Furthermore, the one or more reference RSSIs may be so-called fingerprints. The database 4 may be configured to communicate with the target wireless terminals 3(B).

Each target wireless terminal 3(B) is a portable information processing apparatus, and may be a handheld PC, a smartphone, or the like, for example. The target wireless terminal 3(B) includes a communicating section 30, one or more internal sensors 32, and an estimation apparatus 34.

The communicating section 30 communicates with another device, through wireless communication. As an example in the present embodiment, the communicating section 30 may perform wireless communication with the transmitter 2.

The one or more internal sensors 32 measure physical values relating to the position, orientation, and the like of the target wireless terminal 3(B). Each internal sensor 32 may supply measurement data to the estimation apparatus 34. The physical values that are measured may be different from the RSSI of the received signal that is received by the communicating section 30. The one or more internal sensors 32 may be inertia sensors and, as an example, may be acceleration sensors and/or gyro sensors. In this case, the one or more internal sensors 32 may measure acceleration and/or angular-acceleration as the physical values. Instead of or in addition to this, the one or more internal sensors 32 may be magnetic sensors and/or pressure sensors. In this case, the one or more internal sensors 32 may measure geomagnetism and/or atmospheric pressure as the physical values.

The estimation apparatus 34 estimates the offset (also referred to as an RSSI offset) between the RSSI observed by the fingerprint collecting terminal 3(A) and the RSSI observed by the target wireless terminal 3(B). The offset may be used when performing localization using RSSI. The RSSI offset may be due to the communication characteristics between the fingerprint collecting terminal 3(A) and the target wireless terminal 3(B).

The estimation apparatus 34 includes a target RSSI acquiring section 340, an RSSI set selecting section 342, a reference RSSI acquiring section 344, and an estimating section 346. These sections may be realized by hardware, or may be realized by cooperation between software and hardware, such as a processor. As an example, each section may be realized by having the processor execute a program.

The target RSSI acquiring section 340 acquires a plurality of RSSIs observed by the target wireless terminal 3(B). The target RSSI acquiring section 340 may acquire the strengths of a plurality of wireless signals received by the communicating section 30. The target RSSI acquiring section 340 may supply the RSSI set selecting section 342 with the plurality of acquired RSSIs.

The RSSI set selecting section 342 selects a set of RSSIs which is a portion of the plurality of acquired RSSIs. The RSSI set selecting section 342 may supply the reference RSSI acquiring section 344 with the selected set of RSSIs. The number of RSSIs included in the set of RSSIs may be a reference number.

The reference number may be set to a predetermined number (e.g., 10) through trial and error, or may be set based on the number of RSSIs acquired by the target RSSI acquiring section 340. As an example, the reference number may be calculated by multiplying the number of RSSIs acquired by the target RSSI acquiring section 340 and a reference ratio (e.g., 0.5). The reference ratio may be set through trial and error.

Instead, the set of RSSIs may include RSSIs with a higher strength than a reference strength (also referred to as one RSSI). The reference strength may be set based on the strength distribution of the RSSIs acquired by the target RSSI acquiring section 340. For example, the reference strength may be set such that a ratio of RSSIs larger than the reference strength in the strength distribution is the reference ratio, or the number of RSSIs larger than the reference strength in the strength distribution is the reference number. Instead of or in addition to this, the reference strength may be set to one RSSI of RSSIs acquired by the target RSSI acquiring section 340. For example, the one RSSI may be selected from RSSIs acquired by the target RSSI acquiring section 340, such that the number of RSSIs included in the set of RSSIs is the reference number.

The reference RSSI acquiring section 344 acquires the set of reference RSSIs corresponding to the set of RSSIs, from among the plurality of reference RSSIs stored in the database 4. Here, the set of reference RSSIs corresponding to the set of RSSIs may mean that they originate from wireless signals emitted from the same transmitters. Instead, the set of reference RSSIs corresponding to the set of RSSIs may mean that the position corresponding to the set of reference RSSIs and the estimated position where the set of RSSIs is observed are the same. The estimated position may be estimated by the estimating section 346 using a particle filter method (e.g., sequential Monte Carlo method) or the like as described below. The set of reference RSSIs corresponding to the set of RSSIs may include the same number of RSSIs as the set of RSSIs. The reference RSSI acquiring section 344 may supply the estimating section 346 with the acquired set of reference RSSIs.

The estimating section 346 estimates the RSSI offset of the target wireless terminal 3(B), based on the set of RSSIs and the set of reference RSSIs. The estimating section 346 may further perform localization of the target wireless terminal 3(B). For example, the estimating section 346 may perform localization using a general state-space model, and in the present embodiment may perform localization using a particle filter method, for example.

With the target wireless terminal 3(B) described above, the RSSI offset is measured based on the set of RSSIs selected from among the plurality of acquired RSSIs and the corresponding set of reference RSSIs. Accordingly, the number of RSSIs and reference RSSIs used to estimate the RSSI offset is reduced, and therefore it is possible to reduce the load of the RSSI offset estimation.

Figure 2:
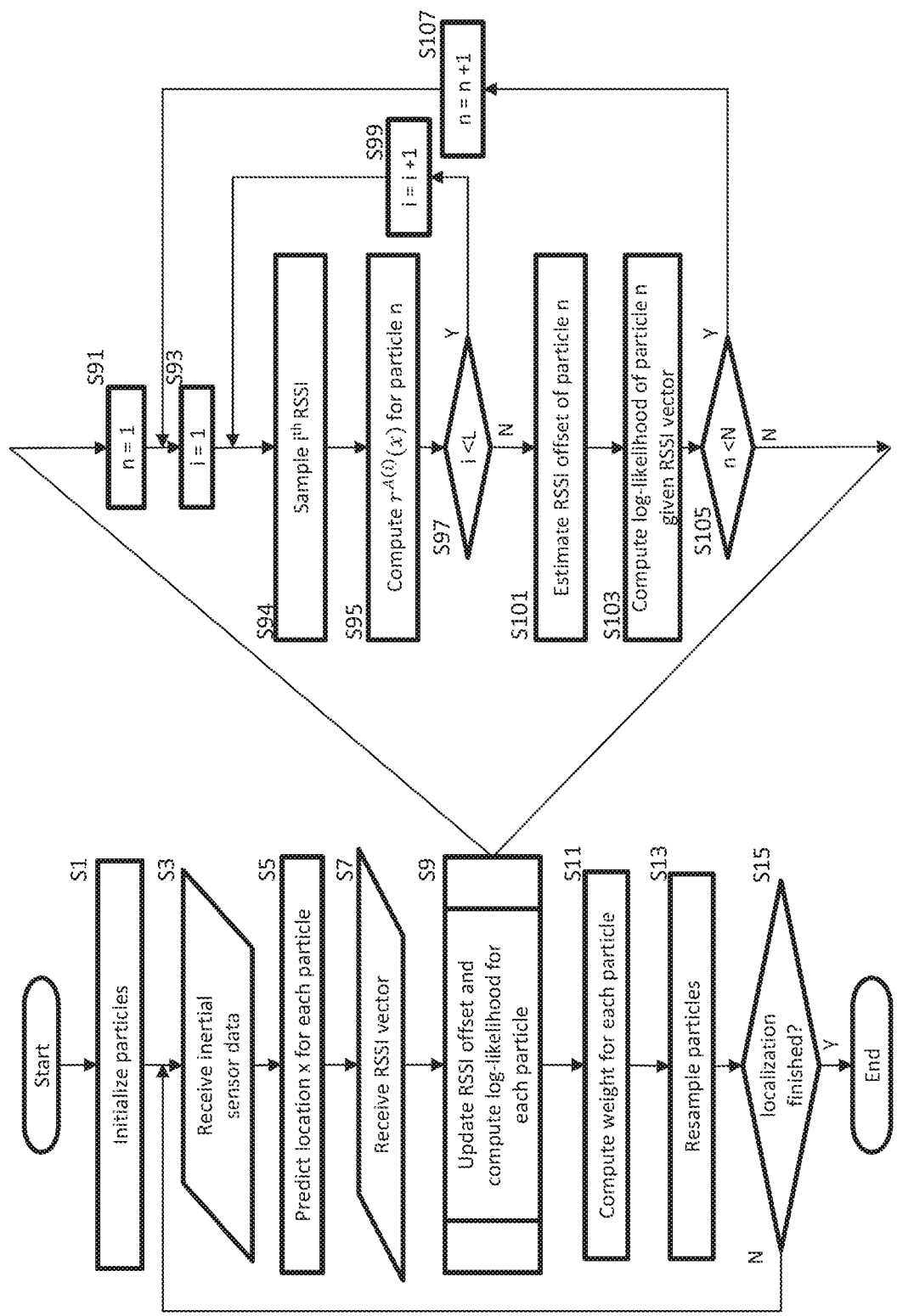
FIG. 2 is a block/flow diagram showing a system/method according to an embodiment of the present invention.

FIG. 2 shows a lock/flow diagram of a system/method according to an embodiment of the present invention. The target wireless terminal 3(B) estimates the RSSI offset by performing steps S1 to S15.

First, at step S1, the estimating section 346 initializes the plurality of particles used in the particle filter method. As an example in the present embodiment, each particle shows an estimated position (x) of the target wireless terminal 3(B). The particle initialization may include deleting the data of particles calculated during the previous operation.

Next, at step S3, the estimating section 346 acquires the measurement data from the one or more internal sensors 32. This measurement data may be used as the measurement data at a timing (t).

Next, at step S5, the estimating section 346 estimates a plurality of estimated positions ($x_t$) estimated as the position of the target wireless terminal 3(B) at the timing (t), based on the measurement data of the one or more internal sensors 32. For example, the estimating section 346 may calculate the estimated positions ($x_t$) from at least one of the movement direction, the movement time, and the movement distance indicated by the measurement data. Each estimated position (x) is used as a particle. If there are one or more previously calculated particles present, the estimating section 346 may calculate the estimated positions ($x_t$) based on the respective estimated positions ($x_{t-1}$) of these particles. As an example in the present embodiment, the number of particles (N) may be a sufficiently large integer, e.g., 500.

Next, at step S7, the target RSSI acquiring section 340 acquires an RSSI vector that includes a plurality of RSSIs obtained by receiving the plurality of wireless signals from the plurality of transmitters 2. For example, the target RSSI acquiring section 340 may generate the RSSI vector by measuring the RSSI of each wireless signal received by the communicating section 30.

Next, at step S9, the estimation apparatus 1 calculates and updates the RSSI offset, and also calculates the log-likelihood of each particle. This process is described in further detail below.

Next, at step S11, the estimating section 346 calculates a weight coefficient (w) for each of the N particles, based on the log-likelihood of each particle. For example, the estimating section 346 may calculate a weight coefficient ($W^{(n)}$) for an n-th particle, where n is an integer and $1 \leq n \leq N$. The particle numbering may be set arbitrarily. The estimating section 346 may calculate the weight coefficient ($W^{(n)}$) by normalizing the log-likelihood of each particle. As an example, the estimating section 346 may calculate the weight coefficient ($W^{(n)}$) from Expression (i) shown below. In this expression, l(n) is the log-likelihood, and is a simplification of the right side of Expression (ii). For example, if there is an RSSI offset ($\delta_t^{(n)}$) at the estimated position ($x_t^{(n)}$) at the timing (t), l(n) is the log-likelihood that the target wireless terminal 3(B) observes the RSSI vector ($\vec{r}_t^{B(1:L)}$). The RSSI vector ($\vec{r}_t^{B(1:L)}$) includes the RSSIs with the first L-th strengths, from among the RSSIs observed by the target wireless terminal 3(B) at the timing (t). Here, $x_t^{(n)}$ may be an identification number for identifying a position, or may be a vector indicating positional coordinates. The calculated weight coefficient $w^{(n)}$ satisfies the expression $w^{(1)} + w^{(2)} + \ldots + w^{(N)} = 1$.

Expression 1

$$w^{(n)} = \frac{l^{(n)}}{\sum_{m=1}^{N} l^{(m)}} \qquad (i)$$

$$l^{(n)} = l^{(n)}\left(\vec{r}_t^{B(1:L)} \middle| x_t^{(n)}, \delta_t^{(n)}\right) \qquad (ii)$$

Next, at step S13, the estimating section 346 samples the plurality of particles based on the calculated weight coefficients ($w^{(n)}$). For example, the estimating section 346 may select less than N particles in order from the largest weight coefficient ($w^{(n)}$).

Furthermore, the estimating section 346 may estimate the position of the target wireless terminal 3(B) based on the weight coefficients ($w^{(n)}$) of the plurality of particles. For example, the estimating section 346 may estimate one estimated position (x) of the target wireless terminal 3(B) at the timing (t), by calculating the weighted average of the coordinates of the estimated position ($x_t$) of each particle.

Next, at step S15, the estimation apparatus 34 determines whether the localization has ended. For example, the localization may end according to an end operation from the user. If it is determined that the localization has not ended (S15; No), the estimation apparatus 34 moves the process to step S3. The period for repeating the process may be 1 second, for example. On the other hand, if it is determined that the localization has ended (S15; Yes), the estimation apparatus 34 ends the process.

The following describes the process of step S9. The target wireless terminal 3(B) estimates the RSSI offset for the estimated position (x) of each particle, by performing the process from steps S91 to S105.

In the process of step S9, first, at step S91, the estimation apparatus 34 sets the particle number (n) to be 1. The estimated position of the n-th particle ($x^{(n)}$) is one example of a sample position. Furthermore, at step S93, the estimation apparatus 34 sets the RSSI number (i) to be 1. The number (i) may be the order of the RSSI strengths.

Next, at step S94, the RSSI set selecting section 342 samples the i-th RSSI from among the plurality of RSSIs included in the RSSI vector acquired at step S7. The sampled RSSIs are included in the set of RSSIs.

Next, at step S95, for the estimated position ($x^{(m)}$) of the n-th particle, the reference RSSI acquiring section 344 acquires from the database 4 the i-th reference RSSI observed by the fingerprint collecting terminal 3(A) at this estimated position ($x^{(m)}$). In this way, the reference RSSI associated with the estimated positions where the set of RSSIs is observed is acquired from the database 4. Instead, the reference RSSI acquiring section 344 may acquire from the database 4 the reference RSSI which originates from the same transmitter as the RSSI sampled at step S94 from among reference RSSIs observed by the fingerprint collecting terminal 3(A) at the estimated position ($x^{(m)}$). In this case, the reference RSSI acquiring section 344 may acquire from the database 4 the reference RSSI, using as a key an ID of a transmitter, included in a wireless signal corresponding to the sampled RSSI. The acquired reference RSSIs are included in the set of reference RSSIs.

If there is no reference RSSI at an estimated position ($x^{(m)}$) in the database 4, the reference RSSI acquiring section 344 may calculate a predicted value of the reference RSSI at the estimated position ($x^{(m)}$). For example, the reference RSSI acquiring section 344 may calculate the predicted value of the reference RSSI at the estimated position ($x^{(m)}$) using the reference RSSIs associated with one or more positions that are closest to the estimated position ($x^{(m)}$), from among the positions registered in the database 4.

Next, at step S97, the estimating section 346 determines whether the RSSI number (i) is less than L. Here, L is one example of a reference number, and is the number of elements in the set. Furthermore, L may be an integer greater than or equal to 1. As one example, the value of L may be set such that each RSSI included in the set of RSSIs has a higher strength than the one RSSI. For example, the number of RSSIs with a higher strength than the one RSSI of the RSSIs included in the RSSI vector acquired in step S7, may be set as the value of L.

If the number (i) is less than L at step S97 (S97; Yes), the estimation apparatus 1 moves the process to step S99 and increments the number (i), and then moves the process to step S95. In this way, as a result of the process of step S94 being repeated, L RSSIs having higher strengths than the one RSSI in the RSSI vector are selected as the set of RSSIs. Furthermore, as a result of the process of step S95 being repeated, L reference RSSIs corresponding to the set of RSSIs, among the plurality of reference RSSIs, are acquired as the set of reference RSSIs. In this way, a truncated distribution having the reference RSSI (also referred to as the one reference RSSI) corresponding to the one RSSI in the probability distribution of the reference RSSIs as a lower limit is used as the probability distribution of the conditional probability that the set of reference RSSIs is obtained. If the number (i) is equal to or greater than L (S97; No), the estimation apparatus 1 moves the process to step S101.

At step S101, the estimating section 346 estimates the RSSI offset of the target wireless terminal 3(B) at the estimated position ($x^{(m)}$), based on the set of RSSIs and the set of reference RSSIs. The estimating section 346 may estimate the RSSI offset by smoothing the time series of the RSSI offset of the target wireless terminal 3(B). As one example, the estimating section 346 may perform the smoothing by applying a Kalman filter to the time series of the RSSI offset. The estimating section 346 may estimate the RSSI offset by performing a process other than a time series filter, using a maximum likelihood method or the like, for example. Each of these processes is described in further detail below.

Next, at step S103, the estimating section 346 calculates the conditional probability of the set of reference RSSIs being observed by the fingerprint collecting terminal 3(A) and the target wireless terminal 3(B) observing the set of RSSIs. The estimating section 346 may calculate the log-likelihood of the estimated positions ($x^{(m)}$), with the reference RSSI vector being assumed.

For example, the estimating section 346 prepares the probability distribution of the i-th RSSI observed by the fingerprint collecting terminal 3(A) at the estimated position ($x^{(m)}$), as the reference probability distribution $p(r^{A(i)}|x)$ of the i-th RSSI. Furthermore, the estimating section 346 prepares the average and the variance of the reference probability distribution $p(r^{A(i)}|x)$ of the i-th RSSI as the reference average ($\mu^{A(i)}(x^{(m)})$) of the i-th RSSI and the reference variance ($\sigma^{A(i)2}(x^{(m)})$) of the i-th RSSI. The reference average ($\mu^{A(i)}(x^{(m)})$) and the reference variance ($\sigma^{A(i)2}(x^{(m)})$) are values calculated from each fingerprint and estimated position ($x^{(m)}$) of the fingerprint collecting terminal 3(A). For example, the reference average ($\mu^{A(i)}(x^{(m)})$) and the reference variance ($\sigma^{A(i)2}(x^{(m)})$) are obtained as the output of a function having, as an input, the estimated position ($x^{(m)}$) in a regression model prepared in advance. By using the normal distributions with the reference average ($\mu^{A(i)}(x^{(m)})$) and the reference variance ($\sigma^{A(i)2}(x^{(m)})$) it is possible to calculate the probability distribution of i-th RSSI ($r^{A(i)}$) observed by the fingerprint collecting terminal 3(A) at the estimated position ($x^{(m)}$).

Furthermore, the estimating section 346 calculates the log-likelihood of the RSSI offset ($\delta_t$) and the estimated ($x^{(m)}$) position at the time when the RSSI ($r_t^{B(i)}$) is observed, from the normal distribution with the average ($\mu^{A(i)}x^{(m)}+\delta_t$) and the variance ($\sigma^{A(i)2}(x^{(m)})$). As one example, the estimating section 346 may set the probability distribution of the RSSI ($r_t^{B(i)}$) in such a distribution as the likelihood of the estimated position ($x^{(m)}$). The log-likelihood of the RSSI offset ($\delta_t$) and the estimated position ($x^{(m)}$) at the time when the RSSI vector ($\vec{r}_t^{B(1:L)}$) is observed may be equal to the sum of the log-likelihood of the first to L-th RSSIs.

At step S105, the estimation apparatus 34 determines whether the particle number (n) is less than the total number (N) of particles. If the number (n) is determined to be less than the total number (N) (S105; Yes), the estimation apparatus 34 moves the process to step S107 and increments the number (n), and then moves the process to step S93. In this way, as a result of repeating the process of step S94, the sets of reference RSSIs corresponding respectively to the estimated positions of the plurality of particles, e.g., the plurality of sample positions, are acquired. Furthermore, as a result of repeating the process of step S101, the RSSI offset of the target wireless terminal 3(B) is estimated for each set of reference RSSIs. Yet further, as a result of repeating the process of step S103, the conditional probability of the target wireless terminal 3(B) observing the set of RSSIs is calculated for each set of reference RSSIs. If it is determined that the number (n) is greater than or equal to the total number (N) at step S105 (S105; No), the estimation apparatus 34 ends the process of step S9.

With the method described above, one or more RSSIs having higher strengths than the one RSSI, among the plurality of observed RSSIs, are selected as the set of RSSIs, and therefore it is possible to limit the number of calculations to perform the process of S95. It is also possible to increase the accuracy of the localization and/or RSSI offset estimation compared to a case where RSSIs with low strengths are selected.

Furthermore, since the time series of the RSSI offset of the target wireless terminal 3(B) is smoothed using a Kalman filter, it is possible to increase the accuracy of the RSSI offset estimation.

The following describes the process of step S103. FIG. 3 shows exemplary expressions used in the process of step S103. The estimating section 346 estimates the RSSI offset ($\delta$) of the target wireless terminal 3(B) for the estimated position ($x_t$) ($=x^{(m)}$) of each particle at the timing (t) using these expressions.

In the process of FIG. 3, an RSSI vector ($\vec{r}_t^{B(1:L)}$), such as shown in Expression (1), is used as the observed RSSI vector that is observed by the target wireless terminal 3(B). The observed RSSI vector ($\vec{r}_t^{B(1:L)}$) is a collection of RSSIs selected at step S95, and is one example of the set of RSSIs.

The probability model p of an observed RSSI vector, such as shown in Expression (2), is used. The left side in this expression indicates the probability of the observed RSSI vector ($\vec{r}_t^{B(1:L)}$) being acquired by the target wireless terminal 3(B), in a case where the reference RSSI vector ($\vec{r}^{A(1:L)}(x_t)$) is obtained for the estimated position ($x_t$), there is an RSSI offset ($\delta_t$), and an RSSI ($r_t^{B(L+1)}$) that is less than the one RSSI is observed. The right side of this expression is the product of the probabilities of RSSI ($r_t^{B(i)}$) being observed by the target wireless terminal 3(B), in a case where the reference RSSI ($r^{A(i)}(x_t)$) is obtained for the estimated position ($x_t$) and there is an RSSI offset ($\delta_t$). Since each element of the RSSI vector observed by the target wireless terminal 3(B) is offset uniformly by the RSSI offset ($\delta$) relative to each element of the reference RSSI vector, the probability model p may be obtained by offsetting the mean of the probability model of the reference RSSI vector ($r^{A(1:L)}$) observed by the fingerprint collecting terminal 3(A). The RSSI offset ($\delta_t$) is the offset calculated at step S101, and may be a different value for each estimated position ($x^{(n)}$) of a particle.

Furthermore, a value defined such as shown in portion (3) is set. Here, [$\delta_{t:s}$] and [$\sigma_{t:s}^{\delta2}$] are respectively the estimated RSSI offset at the timing (t) and the variance thereof, in a case where the observed RSSIs up to the timing (s) are provided, and are used in Expressions (4), (7) to (9), and the like described further below. Furthermore, [$\sigma_t^{b2}$] is the noise variance that is in consideration of the uncertainty in the variance ($\sigma_{t:t-1}^{\delta2}$) of the estimated RSSI offset, and is used in Expression (4) and the like described further below.

First, as shown in Expression (4), the estimated RSSI offset ($\delta_{t-1:t-1}$) at the timing (t-1) in a case where the observed values until the timing (t-1) are provided is set as a tentative estimated RSSI offset ($\delta_{t:t-1}$) at the timing (t). In other words, the previous estimated RSSI offset is set as the current tentative estimated RSSI offset. Similarly, the total noise variance and the variance of the previous estimated RSSI offset is set as a new estimated RSSI offset variance ($\sigma_{t:t-1}^{\delta2}$). The tentative estimated RSSI offset ($\delta_{t:t-1}$) is used in Expression (8) and the like described further below. The estimated RSSI offset variance ($\sigma_{t:t-1}^{\delta2}$) is used in Expressions (7) and (9) described further below.

Furthermore, as shown in Expression (5), the observed RSSI offset variance ($\sigma_t^{r2}$) at the timing (t) is calculated according to the total sum of the inverse of the i-th RSSI reference variance ($\sigma^{A(i)2}(x_t)$). The observed RSSI offset variance ($\sigma_t^{r2}$) is used in Expressions (6), (7), and the like described further below.

Next, as shown in Expression (6), the observed RSSI offset average ($\delta_t^o$) at the timing (t) is calculated. The observed RSSI offset average ($\delta_t^o$) is used in Expression (8) and the like described further below.

Next, as shown in Expression (7), the Kalman gain ($K_t$) at the timing (t) is calculated. The Kalman gain ($K_t$) is used as the weight coefficient in the Kalman filter process. As an example in the present operation, the Kalman gain ($K_t$) may be calculated using the RSSI offset variance. The Kalman gain ($K_t$) is used in Expression (8) described further below.

As shown in Expressions (8) and (9), the estimated RSSI offset ($\delta_{t:t}$) at the timing (t) and the variance ($\sigma_{t:t}^{\delta2}$) thereof, in a case where the observed values until the timing (t) are provided, are calculated. In this way, the time series of each of the RSSI offset ($\delta$) and the variance ($\sigma$) thereof is smoothed according to the Kalman filter.

The following description illustrates an exemplary modification of the process of step S103. FIG. 4 shows another example of expressions used in the process of step S103. In the process shown in FIG. 4, a truncated distribution having the one reference RSSI as a lower limit is approximated by a normal distribution having the same average and variance as the truncated distribution, and used to estimate the RSSI offset.

In the process shown in FIG. 4, in the same manner as in FIG. 3, an RSSI vector ($\vec{r}_t^{B(1:L)}$) such as shown in Expression (1') is used as the observed RSSI vector that is observed by the target wireless terminal 3(B). The observed RSSI vector ($\vec{r}_t^{B(1:L)}$) in the present exemplary modification is a collection of RSSIs selected at step S95, and is one example of the set of RSSIs. The right side in this expression may be a collection of RSSIs from the first to the L-th, in order from the highest strength, from the RSSI vector acquired in step S7.

Furthermore, the probability model q of an observed RSSI vector, such as shown in Expression (2'), is used. The numerator on the right side in this expression indicates the probability of RSSI ($r_t^{B(i)}$) being observed by the target wireless terminal 3(B), in a case where the reference RSSI ($r^{A(i)}(x_t)$) is obtained for the estimated position ($x_t$) and there is an RSSI offset ($\delta_t$). The probability P in the denominator on the right side of this expression is the probability that ($r_t^{B(i)}$)<($r_t^{B(L+1)}$).

First, as shown in Expression (4), in the same manner as in FIG. 3, the previous estimated RSSI offset is set as the current tentative estimated RSSI offset. Furthermore, the total noise variance and the variance of the previous estimated RSSI offset is set to a new estimated RSSI offset variance.

As shown in Expression (11), the standardized lower limit ($\alpha$) of the truncated distribution is calculated. The standardized lower limit ($\alpha$) of the truncated distribution indicates the skew amount caused by cutting off the lower portion of the probability distribution of the reference RSSI.

As shown in Expression (12), the reference average ($\mu^{A(i)}(x^{(n)})$) of the i-th RSSI is corrected to be the reference average ($\mu^{A(i)'}(x^{(n)})$), according to the standardized lower limit ($\alpha$) of the truncated distribution. It should be noted that $\phi(\alpha)$ and $\Phi(\alpha)$ are respectively the probability density function and the cumulative distribution function of the standard normal distribution.

As shown in Expression (13), the reference variance ($\sigma^{A(i)}(x_t)$)$^2$ of the i-th RSSI is corrected to be the reference variance ($\sigma^{A(i)'}(x_t)$)$^2$, according to the standardized lower limit ($\alpha$) of the truncated distribution.

As shown in Expression (5'), in the same manner as in Expression (5), the observed RSSI accuracy ($1/\sigma_t^{r2}$) at the timing (t) is calculated. Furthermore, as shown in Expression (6'), in the same manner as in Expression (6), the observed RSSI offset average ($\delta_t^{o'}$) is calculated. As shown in Expression (7'), in the same manner as in Expression (7), the Kalman gain ($K_t'$) is calculated.

As shown in Expressions (8') and (9'), in the same manner as Expressions (8) and (9), the estimated RSSI offset ($\delta_{t:t}$) and the variance ($\sigma_{t:t}^{\delta2}$) thereof are calculated.

With the process described above, the truncated distribution having the one reference RSSI as a lower limit is approximated by a normal distribution and used to estimate the RSSI offset, and therefore it is possible to increase the accuracy of smoothing using the Kalman filter.

In the present embodiment described above, the set of RSSIs is selected by selecting L RSSIs from the acquired RSSI vector, but the set of RSSIs may be selected by selecting RSSIs that are higher than the one RSSI. In this case, the RSSI having the (L+1)-th strength from the RSSI vector may be set as the one RSSI.

Furthermore, in the above description the set of reference RSSIs is acquired by acquiring L reference RSSIs in order from the highest strength, but instead, the set of reference RSSIs may be acquired by generating a truncated distribution in which the one reference RSSI is the lower limit, from the probability distribution of the reference RSSIs, and acquiring each reference RSSI in this truncated distribution.

In the above description, localization is performed by the estimating section 346 in time series using a general state-space model, but localization may be performed using another method. For example, the estimating section 346 may sequentially acquire RSSI vectors having reference time lengths (e.g., 1 second) observed by the target wireless terminal 3(B), and perform localization by matching the RSSI vectors with fingerprints in the database 4. In this case, the estimating section 346 may repeatedly perform, in an alternating manner, RSSI offset estimation based on the estimated positions of the localization results and localization based on the RSSI offsets of the estimation results.

In the above description, the target wireless terminal 3(B) includes one or more internal sensors 32, but the target wireless terminal 3(B) does not need to include these internal sensors 32. In this case, the target wireless terminal 3(B) may perform localization and/or RSSI offset estimation using an external sensor.

Figure 5:
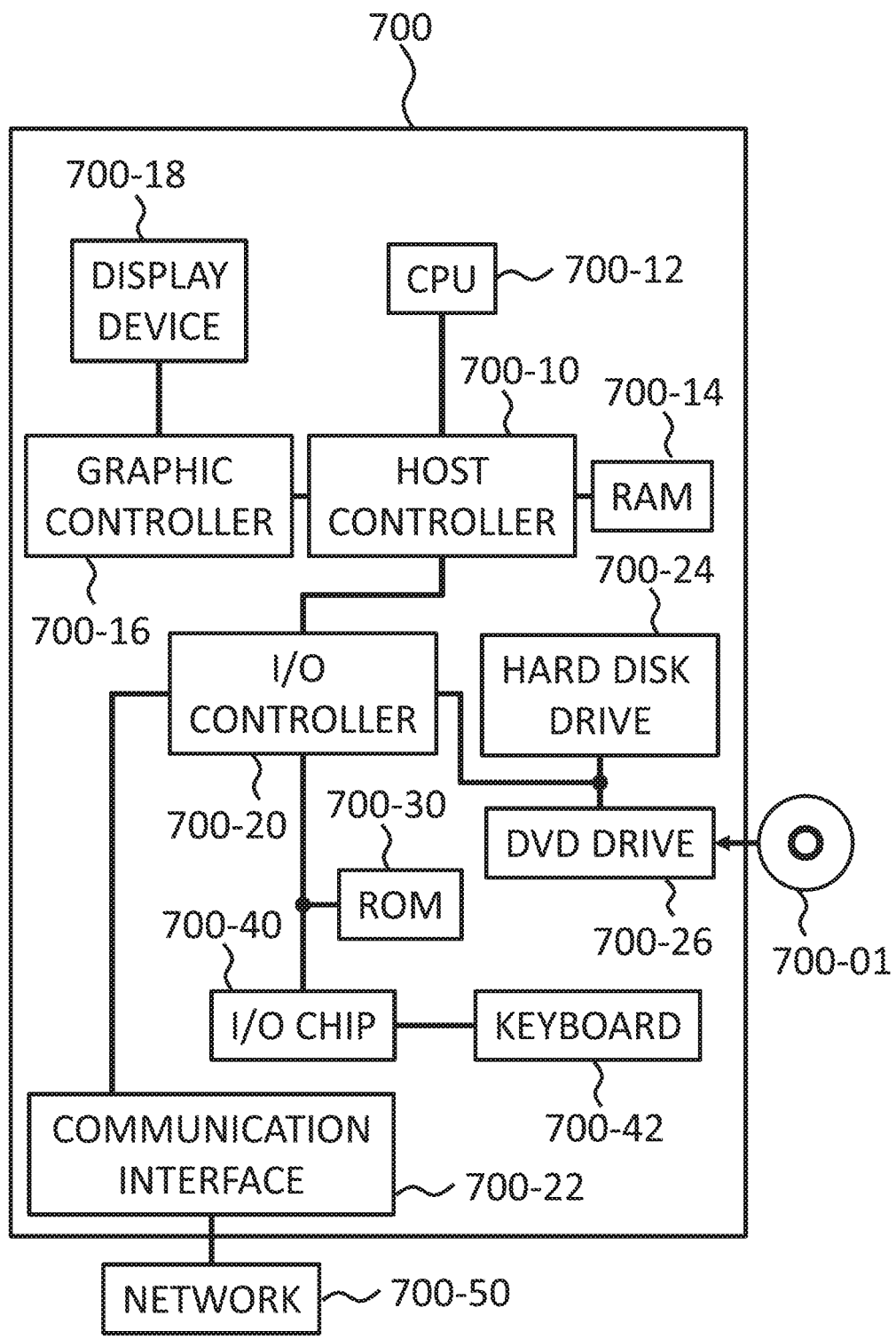
FIG. 5 shows an exemplary hardware configuration of a computer according to an embodiment of the present invention.

FIG. 5 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units, such as a communication interface 700-22, a hard disk drive 700-24, a DVD-ROM drive 700-26 and an IC card drive, which are connected to the host controller 700-10 via an input/output controller 700-20. The computer also includes legacy input/output units, such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium, such as a hard disk or a RAM provided in a server system connected to a dedicated communication network or the Internet, can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above description, with the embodiments of the present invention, it is possible to reduce the load of the RSSI offset estimation.

What is claimed is:

1. A computer-implemented method comprising:
acquiring a plurality of received signal strength indicators obtained by a target wireless terminal observing a plurality of wireless signals transmitted from a plurality of transmitters;
selecting a set of received signal strength indicators which is a portion of the plurality of received signal strength indicators;
acquiring, using a processor device operatively coupled to a memory, a set of reference received signal strength indicators corresponding to the set of received signal strength indicators, from a database of a plurality of reference received signal strength indicators that serve as a reference for the plurality of received signal strength indicators, the processor device being configured to predict a value of a reference received signal strength indicator determined to be missing from an estimated position in the database based on reference received signal strength indicators associated with one or more positions that are closest to the estimated position in the database; and
estimating a received signal strength indicator offset of the target wireless terminal, based on the set of received signal strength indicators and the set of reference received signal strength indicators, the estimating the received signal strength indicator offset including using a truncated distribution.

2. The method according to claim 1, wherein selecting the set of received signal strength indicators includes selecting one or more received signal strength indicators having higher strengths than a reference strength, as the set of received signal strength indicators.

3. The method according to claim 1, wherein selecting the set of received signal strength indicators includes selecting one or more received signal strength indicators having higher strengths than a received signal strength indicator from the plurality of received signal strength indicators, as the set of received signal strength indicators.

4. The method according to claim 3, the truncated distribution having a reference received signal strength indicator corresponding to the received signal strength indicator as a lower limit, as a probability distribution of a conditional probability of the set of reference received signal strength indicators being received.

5. The method according to claim 4, wherein estimating the received signal strength indicator offset includes approximating the truncated distribution by a normal distribution having a same average and variance as the truncated distribution.

6. The method according to claim 1, wherein estimating the received signal strength indicator offset includes smoothing a time series of the received signal strength indicator offset of the target wireless terminal.

7. The method according to claim 6, wherein smoothing includes smoothing the time series of the received signal strength indicator offset with a Kalman filter.

8. The method according to claim 1, wherein:
the database stores each reference received signal strength indicator from the plurality of reference received signal strength indicators in association with a position where each reference received signal strength indicator is observed;
acquiring the set of reference received signal strength indicators includes acquiring, from the database, a plurality of sets of reference received signal strength indicators corresponding to a plurality of sample positions, each sample position corresponding to each set of reference received signal strength indicators; and
estimating the received signal strength indicator offset includes estimating the received signal strength indicator offset of the target wireless terminal for each of the plurality of sets of reference received signal strength indicators.

9. The method according to claim 8, further comprising:
for each of the plurality of sets of reference received signal strength indicators, calculating a conditional probability of the target wireless terminal observing the set of received signal strength indicators; and
weighting the plurality of sample positions based on the conditional probability calculated for each of the plurality of sets of the reference received signal strength indicators.

10. The method according to claim 9, further comprising estimating a position of the target wireless terminal based on a result of weighting the plurality of sample positions.

11. A computer program product for estimating a received signal strength indicator offset, the computer program product comprising a non-transitory computer readable storage medium having program instructions embodied therewith, the program instructions executable by a device to cause the device to perform operations comprising:
acquiring a plurality of received signal strength indicators obtained by a target wireless terminal observing a plurality of wireless signals transmitted from a plurality of transmitters;
selecting a set of received signal strength indicators which is a portion of the plurality of received signal strength indicators;
acquiring, using a processor device, a set of reference received signal strength indicators corresponding to the set of received signal strength indicators, from a database of a plurality of reference received signal strength indicators that serve as a reference for the plurality of received signal strength indicators, the processor device being configured to predict a value of a reference received signal strength indicator determined to be missing from an estimated position in the database based on reference received signal strength indicators associated with one or more positions that are closest to the estimated position in the database; and
estimating a received signal strength indicator offset of the target wireless terminal, based on the set of received signal strength indicators and the set of reference received signal strength indicators, the estimating the received signal strength indicator offset including using a truncated distribution.

12. The computer program product according to claim 11, wherein selecting the set of received signal strength indicators includes selecting one or more received signal strength indicators having higher strengths than a reference strength, as the set of received signal strength indicators.

13. The computer program product according to claim 12, wherein selecting the set of received signal strength indicators includes selecting one or more received signal strength indicators having higher strengths than a received signal strength indicator from the plurality of received signal strength indicators, as the set of received signal strength indicators.

14. The computer program product according to claim 13, the truncated distribution having a reference received signal strength indicator corresponding to the received signal strength indicator as a lower limit, as a probability distribution of a conditional probability of the set of reference received signal strength indicators being received.

15. The computer program product according to claim 14, wherein estimating the received signal strength indicator offset includes approximating the truncated distribution by a normal distribution having a same average and variance as the truncated distribution.

16. The computer program product according to claim 11, wherein estimating the received signal strength indicator offset includes smoothing a time series of the received signal strength indicator offset of the target wireless terminal.

17. The computer program product according to claim 16, wherein smoothing includes smoothing the time series of the received signal strength indicator offset with a Kalman filter.

18. The computer program product according to claim 11, wherein:
the database stores each reference received signal strength indicator from the plurality of reference received signal strength indicators in association with a position where each reference received signal strength indicator is observed;
acquiring the set of reference received signal strength indicators includes acquiring, from the database, a plurality of sets of reference received signal strength indicators corresponding to a plurality of sample positions, each sample position corresponding to each set of reference received signal strength indicators; and
estimating the received signal strength indicator offset includes estimating the received signal strength indicator offset of the target wireless terminal for each of the plurality of sets of reference received signal strength indicators.

19. The computer program product according to claim 18, further comprising:
for each of the plurality of sets of reference received signal strength indicators, calculating a conditional probability of the target wireless terminal observing the set of received signal strength indicators; and
weighting the plurality of sample positions based on the conditional probability calculated for each of the plurality of sets of the reference received signal strength indicators.

20. An estimation apparatus comprising:
a processor device operatively coupled to a memory comprising program instructions executable by the processor, the processor being configured for:
acquiring a plurality of received signal strength indicators obtained by a target wireless terminal observing a plurality of wireless signals transmitted from a plurality of transmitters;
selecting a set of received signal strength indicators which is a portion of the plurality of received signal strength indicators;
acquiring a set of reference received signal strength indicators corresponding to the set of received signal strength indicators, from a database of a plurality of reference received signal strength indicators that serve as a reference for the plurality of received signal strength indicators, the processor device being configured to predict a value of a reference received signal strength indicator determined to be missing from an estimated position in the database based on reference received signal strength indicators associated with one or more positions that are closest to the estimated position in the database; and
estimating a received signal strength indicator offset of the target wireless terminal, based on the set of received signal strength indicators and the set of reference received signal strength indicators, the estimating the received signal strength indicator offset including using a truncated distribution.

* * * * *